J. G. GOSHON.
Smut Machine.
No. 7,000.
Patented Jan'y 8, 1850.
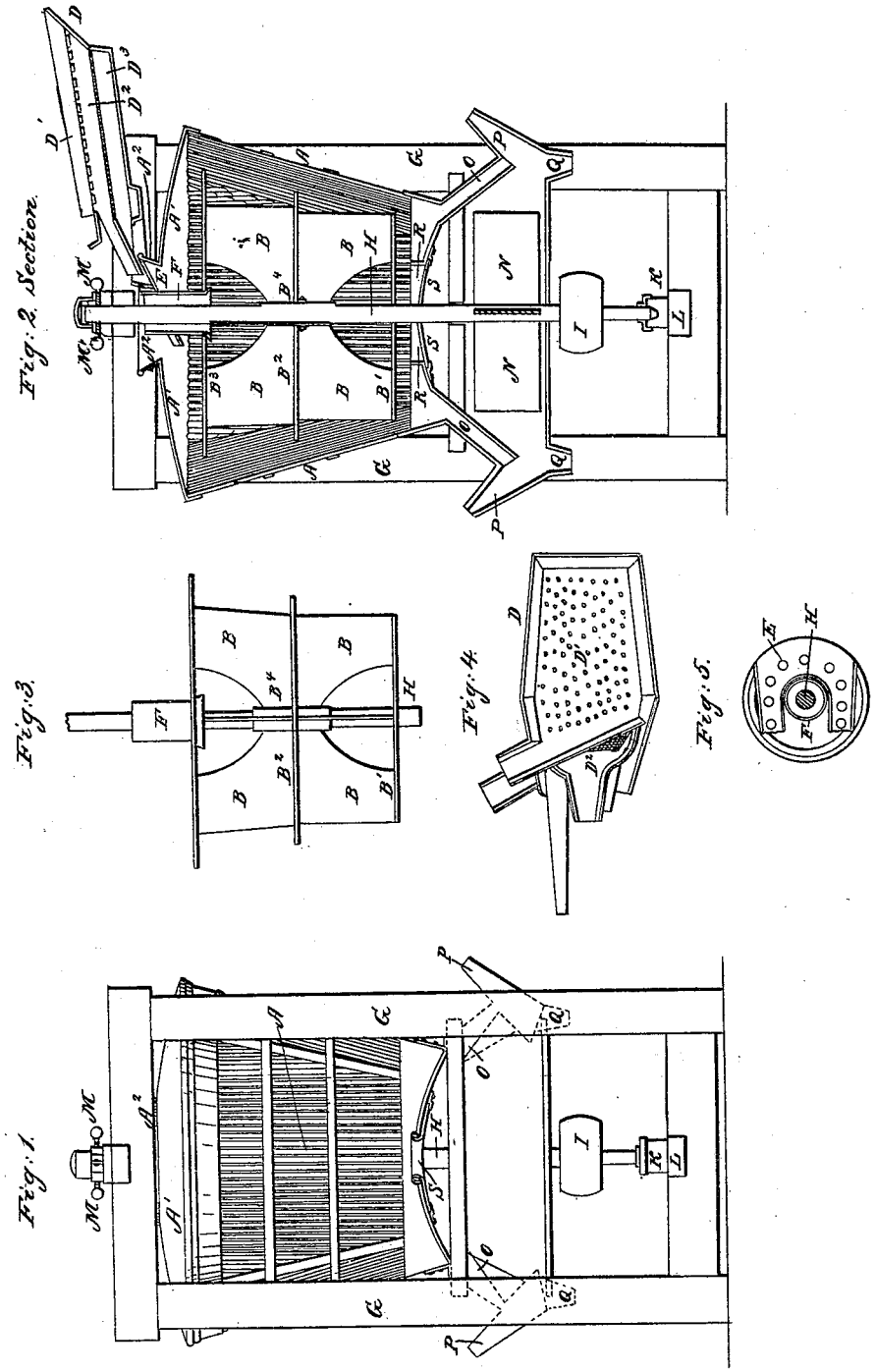

UNITED STATES PATENT OFFICE.

JOSEPH G. GOSHON, OF SHIRLEYSBURG, PENNSYLVANIA.

SMUT-MACHINE.

Specification of Letters Patent No. 7,000, dated January 8, 1850.

*To all whom it may concern:*

Be it known that I, JOSEPH G. GOSHON, of Shirleysburg, in the county of Huntingdon and State of Pennsylvania, have invented certain new and useful Improvements in the Machine for Cleaning Grain from Smut, called "Goshon's Improved Smut-Machine," which is described as follows, reference being had to the annexed drawings of the same, making part of this specification.

Figure 1, is a front elevation of the machine. Fig. 2 is a vertical section of ditto. Fig. 3 is an elevation of the blower and beater B. Fig. 4 is a plan of the shoe. Fig. 5 is a plan of the perforated sheet iron grain distributer.

Similar letters in the several figures refer to corresponding parts.

The general features of this smut machine are like others in use.

The improvements relate to the concave A, the revolving beater and blower B, the shoe D, the grain feeder and distributer E and the air tube F for introducing air to the concave.

The frame G—the main shaft H—driving pulley I box K—bridge tree L—set screws M—fan N—conveying and discharging spouts O, P, Q,—lower air tube R—regulating slides S—are made arranged, and operated in the usual manner.

The concave A is made in the shape of an inverted frustum of a cone with its lower end closed by a concave bottom perforated in the center with a round opening encircled by a curb sufficiently large to admit air to the interior of the concave A—and two oblong openings into which the inclined spouts O, O, are inserted for conducting the grain and whatever dirt or dust may be mixed with it to the blasts of wind produced by the rotary fan N, where the dust is separated from the grain and driven out through the spouts P in the usual manner, while the cleaned grain descends through the spouts Q Q likewise in the usual manner. The principal object in making the bottom of the concave as above described being to cause the grain to gravitate more readily toward the discharging spouts O, O.

The top A' of the concave is also made spherical or domical, and has a round eye in the center encircled by a funnel shape curb A² into which the perforated grain distributer and conveyer E is placed to receive the grain from the shoe D and convey it to the beaters B. The main shaft H and air tube F also pass up through this eye. The sides of the concave are composed of round tapered bars of iron arranged at a suitable distance apart to permit the smut to be blowen through, (but not the grain), held firmly in their required positions by being set in grooves formed in cast iron circular plates and secured by a composition of copper and zinc and by being passed through horizontal rings of metal—orsecured in any convenient way that the mechanic may think advisable to adapt—being, when completed, about 20 inches diameter at the top and fourteen inches at the bottom which will give the rods such an inclination with a horizontal plane as will prevent the grain from falling too fast in the concave while under the operation of having the smut separated from the grain by the revolving beaters.

The revolving beaters and blowers B for beating the grain and throwing it against the sides of the concave as it descends and rebounds toward the center and for blowing the dust and dirt and cockle and imperfect grain and other impurities found mixed with the good grain radially through the spaces between the rods, or meshes of the concave, are composed of eight radial plates B secured between the three horizontal circular plates B', B², B³, of different diameters, the middle plate B², having a round hole in its center to receive a tube B⁴, to which it is firmly fastened and which tube is slipped over the main shaft H and secured thereto so as to revolve with it. The upper circular plate B³, which is the largest in diameter, has a round hole in its center about 3 times the diameter of the main shaft (which passes up through the same) into which hole is inserted a tube F whose lower end is made like an inverted funnel and secured firmly in said upper circular plate so as to revolve with it, and at the same time conduct the air to the space between the upper and middle circular plates B², B³, where a partial vacuum is formed by the rapid motion of the radial plates B, which force the air radially through the meshes of the concave. The upper corners of these plates next the shaft are scalloped in the form of a quarter of a circle. The four radial fans or beaters B are scalloped in the same manner to admit the air to pass more freely to the center of the concave. The lower circular plate B' of the revolving beater has a round opening in its center a little larger the tube R that admits air through the bottom of the concave—said opening being for the purpose of allowing the air drawn in through the tube R to pass to the interior of the concave to supply a partial vacuum made by the rapid rotary motion of the lower radial beaters B in driving the air through the meshes of the concave. The upper and lower edges of the radial plates, or scalloped wings, are fastened to the circular plates above described.

The inclined vibrating shoe D for receiving and separating the impurities from the grain and conducting the latter to the concave and discharging the former outside the concave is composed of a light frame somewhat wider near the middle than at the two ends as shown in Fig. 4, in which is fastened a perforated plate D', for separating the large dirt from the grain, the later passing through the perforations to the wire screen $D^2$, placed directly beneath it for separating the cheat and cockle from the grain, while the large dirt passes off by an inclined spout. The cheat and cockle after passing through the meshes of the wire cloth fall upon an imperforated sheet of iron $D^3$, having a spout which conveys it away. A spout at the lower end of the shoe frame conducts the grain thus separated from a large portion of foreign matters to the inclined perforated distributers E placed in the eye of the dome of the concave for distributing the grain in a circle as it enters the concave so that it shall be acted on more uniformly than if introduced from one point.

The perforated sheet iron distributer E is made in the shape of a horse shoe concave on top and punched full of holes sufficiently large to allow the grain to pass through freely as it descends from the spout of the vibrating shoe and is fastened in the eye of the dome at such angle as may be required to distribute the grain regularly around the circumference of the beater.

By closing the slide S the air will be prevented from entering the concave through the lower tube R, and will enter by the upper tube F alone. When they are drawn back or opened the air will enter by both tubes.

Having described the construction and operation of my improved smut machine what I claim as my invention and desire to secure by Letters Patent is—

Constructing the shoe (having the perforated plate for separating large extraneous matter from the grain) with a screen $D^2$ for separating the cockle and cheat from the grain and an imperforated plate $D^3$, and spout for conducting the same to the outside of the machine as described.

In testimony whereof I have hereunto signed my name before two subscribing witnesses.

JOS. G. GOSHON.

Witnesses:
 HENRY BREWSTER,
 JAMES RAMSEY.